United States Patent

[11] 3,573,566

[72] Inventors Lawrence E. Fournier
Kennebunkport;
Robert S. Shuris, Kennebunk, Maine
[21] Appl. No. 814,374
[22] Filed Apr. 8, 1969
[45] Patented Apr. 6, 1971
[73] Assignee Sprague Electric Company
N. Adams, Mass.

[54] SOLID ELECTROLYTE CAPACITOR WITH AXIAL LEADS AND METHOD OF ATTACHING THE SAME
4 Claims, 2 Drawing Figs.

[52] U.S. Cl. .................................................. 317/230, 29/570
[51] Int. Cl. .................................................. H01g 9/05
[50] Field of Search ........................................ 317/230, 231, 232, 233; 29/570

[56] References Cited
UNITED STATES PATENTS

| | | | |
|---|---|---|---|
| 3,126,503 | 3/1964 | Saloman | 317/230 |
| 3,166,693 | 1/1965 | Haring et al. | 317/230 |
| 3,189,797 | 6/1965 | Okamoto et al. | 317/230 |
| 3,244,946 | 4/1966 | Hilton | 317/230 |
| 3,345,543 | 10/1967 | Sato | 317/230 |
| 3,445,731 | 5/1969 | Saeki et al. | 317/230 |

Primary Examiner—James D. Kallam
Attorneys—Connolly and Hutz, Vincent H. Sweeney, James Paul O'Sullivan and David R. Thornton ABSTRACT: A solid electrolyte capacitor is provided with axially aligned cathode and anode lead wires, with the cathode lead in electrical contact over a substantial portion of the cathode surface. The leads are attached by inserting a capacitor section into a wireform at a point along its length having a preshaped angular configuration designed to generally conform to portions of an end and side surface of the capacitor section. The wireform is connected to both the anode riser and substantial portions of the cathode coating and then severed at nonconforming locations so as to electrically isolate the ends of the wireform.

Patented April 6, 1971            3,573,566

SOLID ELECTROLYTE CAPACITOR WITH AXIAL LEADS AND METHOD OF ATTACHING THE SAME

BACKGROUND OF THE INVENTION

This invention relates to solid electrolyte capacitors and in particular to a capacitor having unique axial lead-wire connections and a method of applying same.

Solid electrolyte capacitors require the attachment of axial lead wires onto the assembled component in such a manner as to make permanent and secure contact with the capacitor electrodes. It is one object of the invention to provide a simple and economical method for attachment of an axial lead wire to the anode and cathode electrodes. It is another object of the present invention to provide a solid electrolyte capacitor having novel lead wire connections.

SUMMARY OF THE INVENTION

Broadly, the invention relates to a solid electrolyte capacitor with an improved anode and cathode lead and more particularly to such lead connection formed by preshaping a wireform to provide a portion of a lead wire to fit the contours of a portion of a capacitor body. For the capacitor embodiment shown herein, the wire will be shaped with four right-angle bends. The wire makes intimate contact with a portion of the anode riser and substantial portions of the cathode surface when the capacitor body is inserted into the contoured portion of the wireform, with both wire ends extending axially away from the capacitor. The lead is secured to the anode riser and to the cathode electrode contacting surface by any preferred means. The wire is then severed in two appropriate locations, thereby electrically isolating the respective ends of the lead wire. The capacitor can then be encapsulate by any preferred means.

From the above, it is seen that the capacitor is provided with securely and simply mounted anode and cathode leads. And because of the preformed shaping of the lead wire, axial alignment of both wires is assured. The above operations lend themselves to mass production techniques and a method is provided for assembling a plurality of capacitors.

DESCRIPTION OF THE INVENTION

Figure 1:
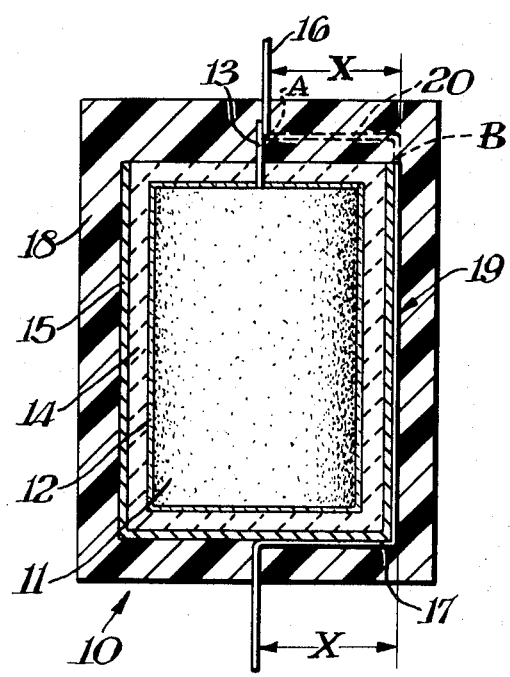
FIG. 1 is a sectional view of a capacitor constructed according to this invention.

Referring to FIG. 1, there is shown a capacitor 10 with a lead arrangement according to the present invention. A cylindrical anode pellet 11, which may be sintered tantalum, is coated (formed) with an oxide 12 e.g., tantalum dioxide, which forms the dielectric layer of the capacitor structure. Riser 13 is connected to and extends axially away from pellet 11. A coating 14 of a suitable solid electrolyte such as manganese dioxide overlies dielectric oxide layer 12. The cathode contact 15 is formed by coating the outer surface of the electrolyte with an appropriate metal. An example of a cathode electrode is a thin film of silver painted onto the electrolyte surface 14.

Riser 13 is connected to lead wire element 16; cathode electrode 15 is connected to lead wire element 17. The unit is encapsulated with any preferred sealant 18 leaving the ends of elements 16 and 17 projecting axially away from the capacitor.

Lead wire elements 16 and 17 are portions of a wireform 19 which had been prebent to form a half frame having four right angles and designed to accommodate portions of the capacitor body. The capacitor is seated into the angle formed by element 17 and besides contacting electrode 15 along its entire length, also abuts a portion of riser 13. Wire element 20, shown dotted in FIG. 1, is the only portion of wireform 19 not in contact with the capacitor at this point. Element 16 is welded to riser 13 and element 17 is connected to the abutting cathode surface by any preferred method i.e., dip soldering.

The wireform 19 is then severed at points A and B, thereby forming separate elements 16 and 17. The length X of the wire is designed so that the ends of the lead extend axially from a seated capacitor.

Figure 2:
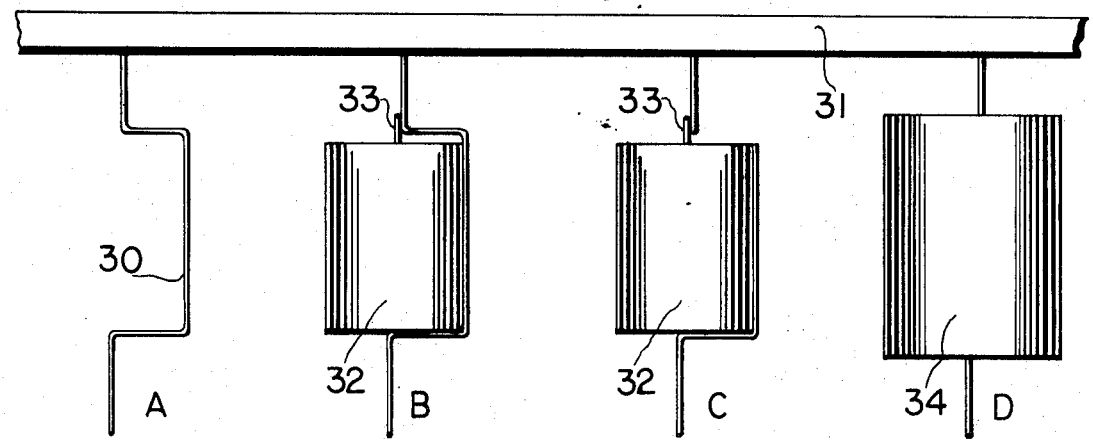
FIG. 2 is a view of several capacitors at various stages of assembly.

FIG. 2 shows a capacitor at various stages of assembly. FIG. 2, A shows the preshaped wireform 30 suspended from a bar 31. FIG. 2, B shows a seated capacitor 32 having an anode riser element 33 aligned with and welded to the upper portions of the wireform 30. The capacitor 32 is soldered in place against the abutting portion of the wireform. FIG. 2, C shows a capacitor assembly with the unconnected portions of the wireform 30 cut away. FIG. 2, D shows the fully molded assembly 34 with the encapsulant covering all the wireform connections. The unit can be severed from the bar 31 at this point.

It is to be understood that the above description has been presented for ease of understanding the invention. An actual assembly operation may consist of performing one operation at a time to a plurality of wireforms suspended from the bar.

From the above, it is seen that the anode and cathode leads for the capacitor unit have been attached using a simple technique. Each cathode lead makes a secure contact along a substantial portion of the cathode surface including lateral supporting along an entire side and both leads are centrally aligned from the capacitor without additional steps required because of the X-dimension of the preshaped wire. The invention can be economically implemented by preparing and positioning required quantities of preshaped wireforms and performing simultaneous capacitor attachment and assembly steps.

We claim:

1. A solid electrolyte capacitor comprising an anode, a dielectric oxide on the surface of said anode, a riser element joined to and projecting away from said anode, a solid electrolyte layer on said dielectric oxide, a cathode layer in contact with said electrolyte layer, a first wire element secured in contact with and elongating said riser element; a second wire element secured in contact with the lateral surface and a portion of an end surface of said cathode layer, both wire elements extending axially away from said anode and being terminals for said capacitor.

2. The capacitor of claim 1 wherein said first wire element and said second wire element are severed portions of a single wireform.

3. A method of attaching lead-in wires to a solid electrolyte capacitor having an anode with a riser element projecting therefrom, a dielectric on the surface of the anode, a solid electrolyte in contact with the dielectric, and a cathode electrode on the electrolyte, said method comprising the steps of:

preshaping a wireform so that the central portion generally conforms to the body of said capacitor and with the end portions in axial alignment for alignment with the capacitor when said capacitor is seated within said deformed central portion;

seating the capacitor within said deformed central portion so that the wireform is in intimate contact with said cathode electrode along the lateral surface, with a portion of the end cathode electrode surface, and with a portion of the anode riser element connection;

securing the wireform to the cathode electrode along the intimate contact lateral surface and to the anode riser element; and removing a section of the wireform between said riser element and said intimate contact lateral surface.

4. The method of claim 3 further comprising: attaching a plurality of said preshaped wireforms to a support means; seating a plurality of capacitors within said deformed central portions, respectively, so that each wireform is in intimate contact along the respective lateral cathode electrode surface, with a portion of the end cathode electrode surface, and with a portion of the anode riser element; securing each wire form to the cathode electrode along said intimate contact lateral surface and to said riser element; and removing each respective wireform section between said riser element and said lateral contact surface; and encapsulating each capacitor.